(12) United States Patent
Ishii

(10) Patent No.: US 7,459,034 B2
(45) Date of Patent: Dec. 2, 2008

(54) STEEL HOOP MADE FROM A MARTENSITIC STEEL STRIP

(75) Inventor: Kazuo Ishii, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 350 days.

(21) Appl. No.: 10/488,108

(22) PCT Filed: Jun. 5, 2003

(86) PCT No.: PCT/JP03/07113

§ 371 (c)(1), (2), (4) Date: Mar. 9, 2004

(87) PCT Pub. No.: WO04/001081

PCT Pub. Date: Dec. 31, 2003

(65) Prior Publication Data

US 2004/0244873 A1 Dec. 9, 2004

(30) Foreign Application Priority Data

Jun. 20, 2002 (JP) .............................. 2002-179413

(51) Int. Cl.
*C22C 38/44* (2006.01)

(52) U.S. Cl. ........................ 148/335; 148/328; 148/318

(58) Field of Classification Search ................. 148/328, 148/333–335, 318, 650, 651, 534; 420/108
See application file for complete search history.

(56) References Cited

U.S. PATENT DOCUMENTS

| 5,023,049 A | * | 6/1991 | Norstrom et al. ............... 420/91 |
| 6,413,329 B1 | * | 7/2002 | Nakatsu et al. ............. 148/333 |
| 6,440,236 B1 | | 8/2002 | Hirmatsu et al. |

FOREIGN PATENT DOCUMENTS

| EP | 1 091 006 A1 | 4/2001 |
| JP | 57-13151 * | 1/1982 |
| JP | 59-080772 | 5/1984 |
| JP | 64-011949 A | 1/1989 |
| JP | 64-025952 | 1/1989 |
| JP | 06-306551 | 11/1994 |
| JP | 11-173385 | 6/1999 |
| JP | 11-229093 | 8/1999 |
| JP | 11-293405 A | 10/1999 |
| JP | 2000-063998 | 2/2000 |
| JP | 2001-105050 | 4/2001 |
| JP | 2002-053936 | 2/2002 |

* cited by examiner

*Primary Examiner*—Deborah Yee
(74) *Attorney, Agent, or Firm*—Arent Fox LLP

(57) ABSTRACT

A steel strip made of martensitic steel contains C+N at not more than 0.12 wt %, Si at not more than 1 wt %, Mn at not more than 7 wt %, Ni at 2 to 24 wt %, Cr at 2 to 16 wt %, Mo at not more than 2.5 wt %, and Ni-Bal value and Ms value defined by the following equations shown by weight percentage of each composition are respectively Ni-Bal≧1.2, Ms≧−28.

Ni-Bal=Ni+0.5Mn+30(C+N)−1.1(Cr+1.5Si)+8.2

Ms=502−810C 1230N−13Mn−30Ni−12Cr−54Cu−46Mo

5 Claims, 6 Drawing Sheets

$\Delta t = |t_1 - t_0|$

STEEL HOOP MADE FROM A MARTENSITIC STEEL STRIP

CROSS-REFERENCE TO RELATED APPLICATION

This application is a National Stage entry of International Application No. PCT/JP2003/007113, filed Jun. 5, 2003, the entire specification claims and drawings of which are incorporated herewith by reference.

BACKGROUND OF THE INVENTION

1. Field of the Invention

The present invention relates to a steel strip made of martensitic steel and to a production technique for a hoop for a continuously variable transmission of an automobile, which is obtained by using this steel strip, and specifically relates to a technology which produces the hoop for a continuously variable transmission with precise size and shape in a simple manner.

2. Description of the Related Art

A hoop for a continuously variable transmission of an automobile must have high-strength in use, and therefore the hoop is produced by using a high-strength material. In manufacturing the hoop, first, both ends of a steel strip, which is a flat material, are welded to each other to obtain an annular or cylindrical member. The member is then cut in a predetermined width. The member is subjected to ring rolling at a reduction of not less than 30% so as to remove irregularities of the welded portion and to provide a predetermined thickness.

As examples of a steel strip used for such a hoop for a continuously variable transmission, Japanese Patent Unexamined (KOKAI) Publication No. 59-80772 proposes to use a maraging steel. Japanese Patent Unexamined (KOKAI) Publication No. 2000-63998 proposes to use a high-strength metastable austenite stainless steel. Japanese Patent Unexamined (KOKAI) Publication No. 2001-172746 proposes to use a high-strength strain induced martensitic steel.

When the maraging steel is used, a high-strength hoop is obtained by rolling, performing a solution treatment for obtaining a uniform rolled structure, and aging. The solution treatment is performed at about 800° C. to 900° C. However, contraction and expansion with transformation in heating and cooling are repeated since the martensite reverse transformation point of the maraging steel is 600° C. to 800° C. Therefore, shape changes such as bending and swells in the width-direction may occur after the solution treatment even if the hoop is rolled in a precise size and shape.

Therefore, changes in size and shape cause by the solution treatment must be corrected in order to obtain precise size and shape as a hoop for a continuously variable transmission of automobile. As a method for obtaining a precise size and shape, for example, Japanese Patent Unexamined (KOKAI) Publication No. 11-173385 proposes to use a heat treatment, and Japanese Patent Unexamined (KOKAI) Publication No. 2001-105050 proposes to apply plastic deformation in cold working. However, considerable labor is required in the above-described method.

When the above described strong metastable austenite stainless steel is used, solution treatment after rolling is not required. Even if aging is required, it can be performed at a temperature of about 400° C. to 500° C., which is not more than the transformation temperature. Therefore, in this case, changes in the size and shape caused by the heat treatment are not significantly observed. Accordingly, a precise product can be obtained, if precise size and shape are obtained by rolling.

However, when conventional metastable austenite type steels described in Japanese Patent Unexamined (KOKAI) Publication No. 2000-63998 or Japanese Patent Unexamined (KOKAI) Publication No. 2001-172746 are used, work hardening in rolling is very large. Therefore, in this case, precise control of plate thickness or circumferential length are difficult, and precise size and shape when used as a hoop for a continuously variable transmission of automobile cannot be obtained.

SUMMARY OF THE INVENTION

Therefore, an object of the present invention is to provide a steel strip made of martensitic steel and a production technique for a hoop for a continuously variable transmission of an automobile obtained by using this steel strip, in which manufacturing is simply performed while yielding precise size and shape of the hoop.

The present invention provides a steel strip made of martensitic steel, the steel strip is characterized in that C+N is not more than 0.12 wt %, Si is not more than 1 wt %, Mn is not more than 7 wt %, Ni is 2 to 24 wt %, Cr is 2 to 16 wt %, Mo is not more than 2.5 wt %, and Ni-Bal value and Ms value defined by the following equations shown by weight percentage of each composition are respectively Ni-Bal$\geq$1.2, Ms$\geq$−28.

$$\text{Ni-Bal} = \text{Ni} + 0.5\text{Mn} + 30(\text{C}+\text{N}) - 1.1(\text{Cr}+1.5\text{Si}) + 8.2$$

$$\text{Ms} = 502 - 810\text{C} - 1230\text{N} - 13\text{Mn} - 30\text{Ni} - 12\text{Cr} - 54\text{Cu} - 46\text{Mo}$$

DETAILED DESCRIPTION OF THE PREFERRED EMBODIMENTS

Figure 1:
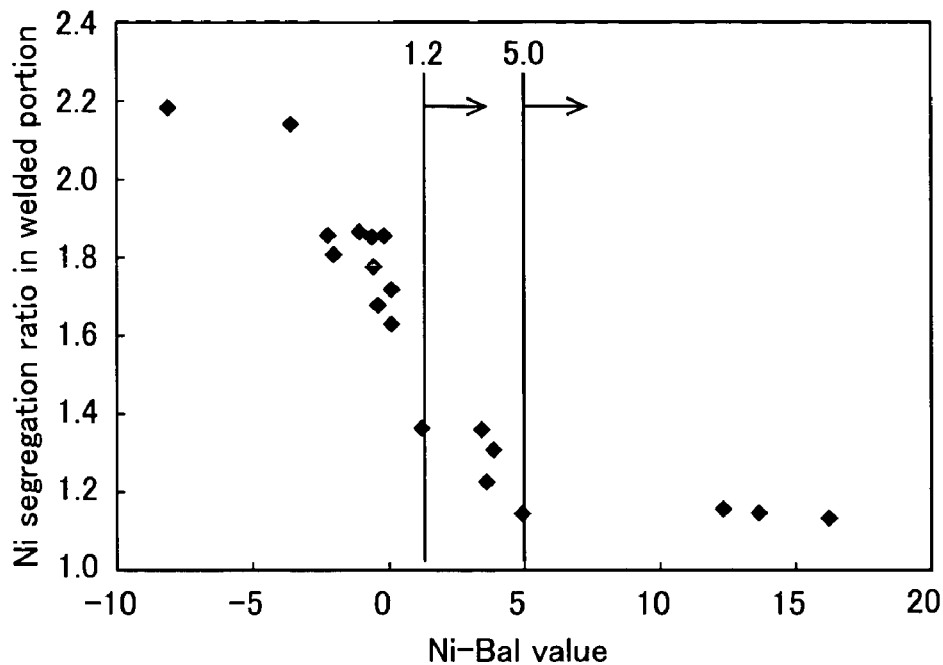
FIG. 1 shows a relationship between Ni segregation ratio and Ni-Bal value in a welded portion.

In the following, reasons for limitations concerned with characteristics of the present invention are explained in detail.

1. Reasons for Limitations Concerned with Content of Basic Compositions

When a solidification structure of Ni—Cr system steel is examined, a Schaeffler diagram is generally used. In a solidification process for an alloy, an austenite crystallizes at an initial stage, and a ferrite may be formed according to composition designs. A ferrite former (for example, Mo) is concentrated in a ä ferrite portion and an austenite former (for example, Ni) is concentrated in an austenite portion. Therefore, segregation is undesirably produced in the composition. Specifically, in a fatigue strength member which is welded like the present invention, the segregation concerning the composition must be suppressed as much as possible so as to obtain a uniform structure.

Based on such knowledge, composition designs in which the ferrite forming area is avoided in a Schaeffler diagram are required. This condition is formulated in accordance with the Schaeffler diagram as follows.

$$\text{Ni equivalent} > 1.125(\text{Cr equivalent} - 8)$$

$$(\text{Ni equivalent} = \text{Ni} + 30\text{C} + 0.5\text{Mn},$$

$$\text{C equivalent} = \text{Cr} + \text{Mo} + 1.5\text{Si} + 0.5\text{Nb})$$

In the present invention, workability is remarkably improved by forming martensite with small work hardening in an annealing condition such as described hereinafter. Therefore, in order to form the initial martensite, setting the composition which corresponds to the martensite forming area in the Schaeffler diagram is required. This condition is formulated in accordance with the Schaeffler diagram as follows.

$$\text{Ni equivalent} < -0.749(\text{Cr equivalent} - 31.5)$$

$$(\text{Ni equivalent} = \text{Ni} + 30\text{C} + 0.5\text{Mn},$$

$$\text{C equivalent} = \text{Cr} + \text{Mo} + 1.5\text{Si} + 0.5\text{Nb})$$

Then, Ni is a stabilizing element for austenite, and a condition for forming martensite is that Ni equivalent is not more than 24 in the Schaeffler diagram. Therefore, the upper limit of the Ni content is 24 wt %. Cr is a strengthening element and a ferrite forming element. A condition for forming martensite is that the Cr equivalent is not more than 16 in the Schaeffler diagram. Therefore, the upper limit of Cr content is 16 wt %. The above-mentioned effects concerned with Ni and Cr respectively decrease and ferrite is formed, when the contents of both elements are not more than 2 wt %. Therefore, lower limits of contents for both elements are 2 wt %. These composition ranges are necessary conditions. In order to set a composition range for forming a mainly martensitic structure with high workability, additional limits are required.

2. Reasons for Limitations of Si and Mo Contents.

Si is an inevitable element for steel making processes. However, Si inhibits rolling characteristic and promotes formation of oxides in welding. Therefore, Si content is not more than 1 wt %. Mo is a stabilizing element for ferrite, and can be added so as to adjust austenite amount or martensite amount. However, ferrite is formed by excessive addition of Mo. Therefore, Mo content is not more than 2.5 wt %.

3. Reason for Limitation of Ni-Bal Value

In the Schaeffler diagram, the necessary condition of composition in which ferrite are not formed is mentioned above. More detailed reasons for limitations concerning the composition range are explained hereinafter. As mentioned above, the segregation in composition is formed when a welded portion separates into two phases of the ä ferrite portion and the austenite portion in welding. When a segregation is formed in welding, it is very difficult to remove the segregation in subsequent processes. As a result, uniformity of the structure cannot be obtained, and the fatigue strength decreases. Therefore, it is required to limit the Ni-Bal value defined by the following equations shown by weight percentage of each composition. The Ni-Bal value shows appearance characteristics of the austenite structure in solidification. If the Ni-Bal value is not more than 0, the appearance rate of the ferrite is large, and if it is not less than 0, appearance rate of the austenite is large.

$$\text{Ni-Bal} = \text{Ni} + 0.5\text{Mn} + 30(\text{C} + \text{N}) - 1.1(\text{Cr} + 1.5\text{Si}) + 8.2$$

FIG. 1 shows a relationship between the Ni segregation ratio of the weld portion (data in Table 2 described hereinafter) and the Ni-Bal value (data in Table 2 similarly described hereinafter). The segregation ratio is defined as follows.

$$\text{segregation ratio} = A\text{max}/A\text{min}$$

Amax is the maximum count of Ni characteristic X-ray by EPMA line analysis, and Amin is the minimum count of Ni characteristic X-ray by the EPMA line analysis.

As shown in FIG. 1, the Ni segregation ratio is rapidly increased when the Ni-Bal value is less than 1.2. This is because the solidification structure separates into two phases of austenite and ferrite, thereby causing the Ni segregation. However, when the Ni-Bal value is not less than 5, the segregation ratio is very near to 1. Therefore, the Ni-Bal value was set to be not less than 1.2 by the present inventor. It is more preferable that the Ni-Bal value be set to be not less than 5.

4. Reason for Limitation of Mn Content

Figure 2:
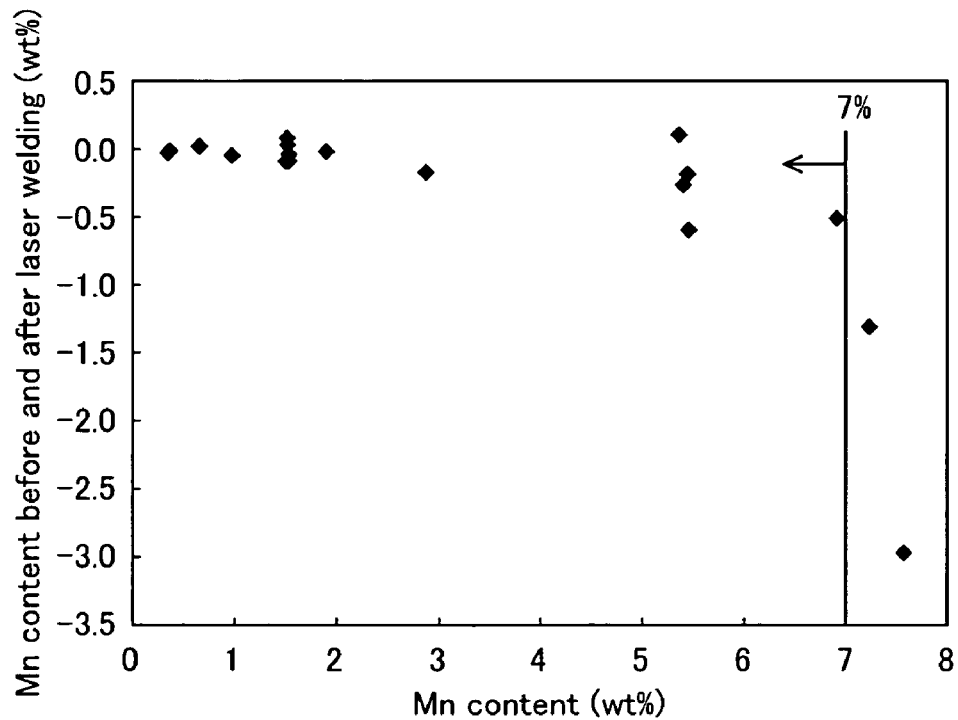
FIG. 2 shows a relationship between change of Mn amount (wt %) and Mn content (wt %) before and after laser welding.

A steel strip of the present invention contains Mn so as to adjust the austenite amount or martensite amount. Mn may evaporate in welding the steel strip when the Mn content is large, since the vapor pressure of Mn is high. FIG. 2 shows a relationship between change in Mn amount before and after laser welding (wt %) (data in Table 2 described hereinafter) and Mn content (wt %) (data in Table 1 described hereinafter). The above change in Mn amount was measured by EPMA. As shown in FIG. 2, the Mn amount rapidly decreases when the Mn content is more than 7 wt %. In the steel strip used for the hoop for a continuously variable transmission of an automobile, characteristics including welded portion must be considered. Therefore, the inventors set the Mn content to be not more than 7 wt % in order to obtain a stabilized composition system even after the welding.

5. Reason for Limitation of Ms Value

Figure 3:
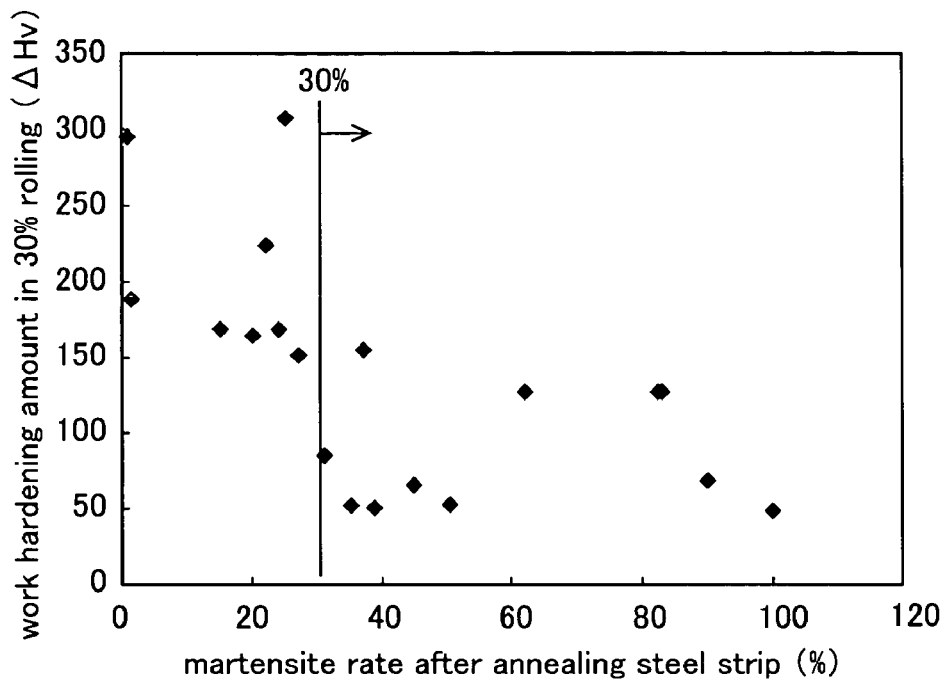
FIG. 3 shows a relationship between work hardening amount (ÄHv) in 30% rolling and martensite rate (%) after annealing steel strip.

When a hoop for a continuously variable transmission of an automobile is produced by using a steel strip of the present invention, work hardening occurs in rolling. The work hardening is caused by formation of strain induced martensite and work hardening of austenite. However, when the martensite structure exists from an initial stage, it is difficult to harden the martensite. FIG. 3 shows a relationship between work hardening amount (ÄHv) in 30% rolling (data in Table 2 described hereinafter) and martensite rate (%) after annealing steel strip (data in Table 2 similarly described hereinafter). The martensite rate is defined by peak intensity ratio of X-ray diffraction. As shown in FIG. 3, the work hardening amount decreases as the martensite rate increases. The work hardening amount can be stably decreased if the martensite rate is not less than 30%. This fact means that the workability improves as the martensite rate increases.

The martensite rate (%) after annealing depends on the Ms value which is defined by the following equation shown by weight percentage of each composition.

Ms=502−810C−1230N−13Mn−30Ni−12Cr−54Cu−46Mo

Figure 4:
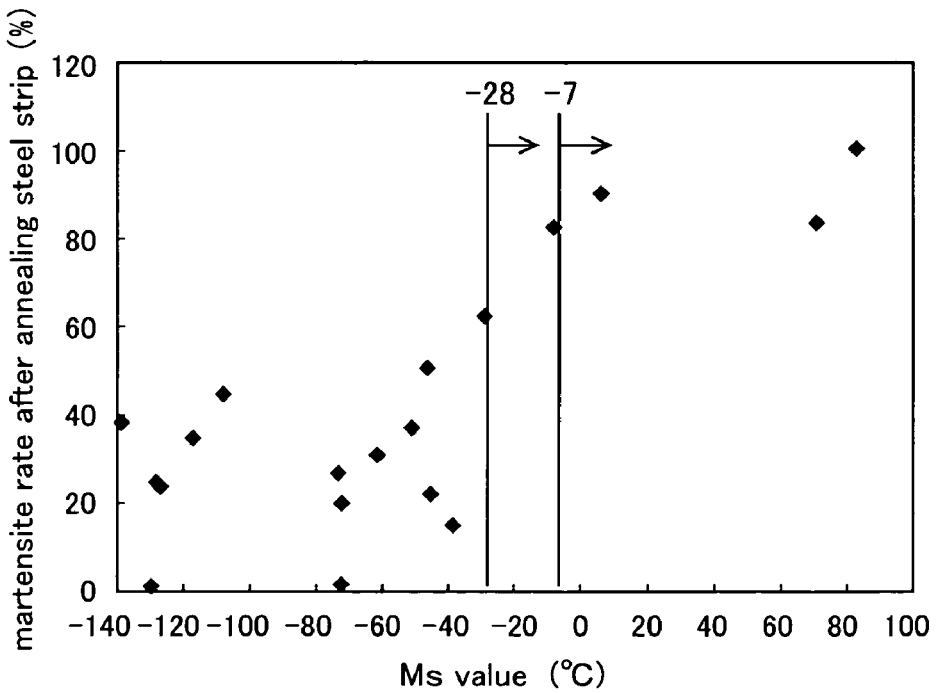
FIG. 4 shows a relationship between martensite rate (%) after annealing the steel strip and Ms value (° C.).

The Ms value is an empirical formula which shows a temperature (° C.) in which 50% martensitic transformation by volume ratio is realized. FIG. 4 shows a relationship between martensite rate (%) after annealing the steel strip (data in Table 2 described hereinafter) and Ms value (° C.) (data in Table 2 similarly described hereinafter). As shown in FIG. 4, the martensite rate can be not less than 60% when the Ms value is not less than −28° C., and the martensite rate can be reliably not less than 80% when the Ms value is not less than −7° C. Then, the present inventors set the Ms value not less than −28° C. so as to stably decrease the work hardening amount. It is more preferable that the Ms value be not less than −7° C.

6. Reason for Limitation of Composition Range of C+N

Figure 5:
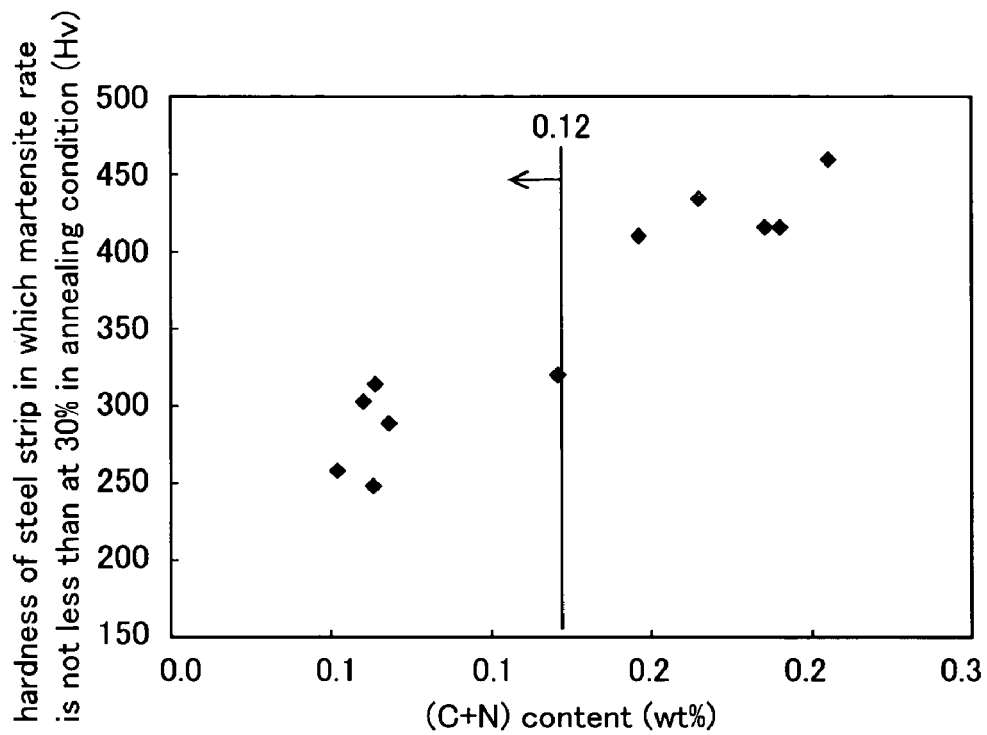
FIG. 5 shows a relationship between hardness (Hv) and C+N content (wt %) of a steel strip in which martensite rate is not less than 30% in a condition of annealing.

As mentioned above, work hardening decreases as the martensite rate increases. However, the workability is not excellent when the initial hardness is high. The initial hardness of martensite depends on the amounts of carbon and nitrogen which are included in the solid solution. FIG. 5 shows a relationship between hardness (Hv) of a steel strip in which the martensite rate is not less than 30% in a condition of annealing (data in Table 2 described hereinafter) and C+N content (wt %) (data in Table 2 similarly described hereinafter). As shown in FIG. 5, the above mentioned hardness extremely increases when the C+N content is more than 0.12 wt %. Therefore, the C+N content must be not more than 0.12 wt % in order to obtain excellent workability based on the initial hardness. Therefore, the inventors set the C+N content to be not more than 0.12 wt % in order to obtain excellent workability based on the initial hardness.

Therefore, according to the present invention, it is provided with a steel strip made of the martensitic steel in which the hoop for continuously variable transmission can be easily produced and the precise size and shape of the hoop can be obtained based on the above-mentioned reason for limitation, without performing a heat treatment described in Japanese Patent Unexamined (KOKAI) Publication No. 11-173385 and the cold plastic deformation described in Japanese Patent Unexamined (KOKAI) Publication No. 13-105050. Preferred embodiments and production method of the present invention are explained hereinafter.

In the invention, the Cr content is preferably 2 to 10 wt %.
Cr: 2 to 10 wt %

Figure 6:
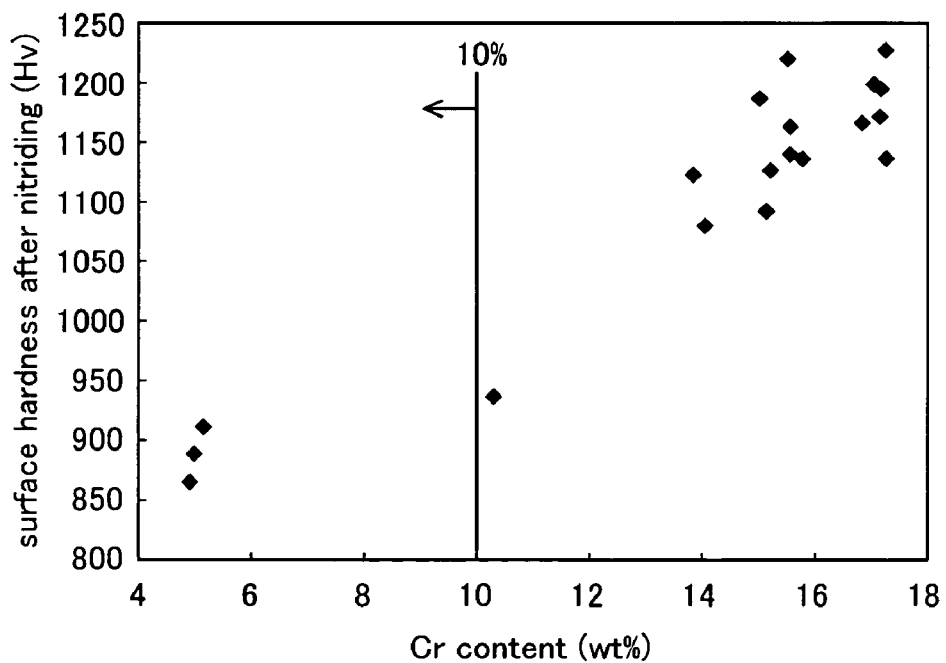
FIG. 6 shows a relationship between surface hardness (Hv) after nitriding and Cr content (wt %).

Nitriding is generally performed when wear resistance is improved by increasing surface hardness of a rolled hoop or when fatigue strength is improved. Specifically, concerning the hoop for a continuously variable transmission of an automobile, a nitride layer called a "white layer" on the surface is observed by an optical microscope. The surface is embrittled when the surface hardness is not less than 1000 in Hv. The hardened layer depth by the nitriding also decreases, and therefore, the fatigue strength decreases. In the Ni—Cr system steel, the surface hardness is extremely high and the white layer is easily formed. In order to avoid such failure, it is effective to decrease Cr which easily forms the nitride as much as possible. FIG. 6 shows a relationship between surface hardness (Hv) after nitriding (data in Table 2 described hereinafter) and Cr content (wt %) (data in Table 1 described hereinafter). When the Cr content is not more than 10 wt %, surface hardness can be decreased, and this is extremely effective for members such as a hoop for a continuously variable transmission of an automobile, which requires curvature fatigue characteristics. The hardened layer depth can be increased because the surface hardness can be relatively decreased, and this fact is also effective for improvement of the fatigue characteristics.

The Cr content is set to be 2 to 10 wt % by the present inventors, based on the above-mentioned knowledge.

Md30 value defined by following equations shown by weight percentage of each composition is set to be not less than 100.

Md30=497−462(C+N)−9.2Si−8.1Mn

−13.7Cr−20(Ni+Cu)−18.5Mo

Md30≧100

As mentioned above, ring rolling which enables precise working can be performed by using a material with good workability. However, when a hoop for continuously variable transmission of an automobile is produced, strengthening by using aging is generally performed in order to additionally improve strength. As examples of providing aging characteristics, an example in which Ti and Al are added (for example, Japanese Patent Unexamined (KOKAI) Publication No. 59-170244), an example in which N is added (for example, Japanese Patent Unexamined (KOKAI) Publication No. 56-139663), an example in which Cu is added (for example, Japanese Patent Unexamined (KOKAI) Publication No. 56-139663), an example in which Si is added (for example, Japanese Patent Unexamined (KOKAI) Publication No. 6-33195), and an example in which Ni and Mn are arranged (for example, "Concerning age hardening characteristics of Fe—Ni—Mn martensitic alloy", Minoru Tanaka etc., a magazine published by The Japan Institute of Metals, Vol. 31 (1967), No. 9, P. 1075~1081) may be mentioned. Ti, Al, and Si are effective as aging elements. However, these elements easily form non-metallic inclusions such as oxides and nitrides, and they are not preferable for producing products in which fatigue strength is required, as in the present invention. Therefore, addition of N and Cu as aging elements or adjustment of Ni and Mn is preferable.

Aging must be performed at a temperature of not more than the transformation temperature in order to age without decreasing the size precision. In steel mainly made of martensite as in the present invention, the aging must be performed at not more than 600° C. since the martensite inverse transformation temperature is 600 to 800° C. It is important to control a structure after the rolling in order to obtain excellent aging characteristics in such a temperature range. Because packing rate of martensite is lower than that of austenite since the crystal structure of the martensite is bct and the crystal structure of the austenite is fcc, and therefore, when the martensite amount is large, the diffusion amount of the aging elements is large, to improve the aging characteristics.

Figure 7:
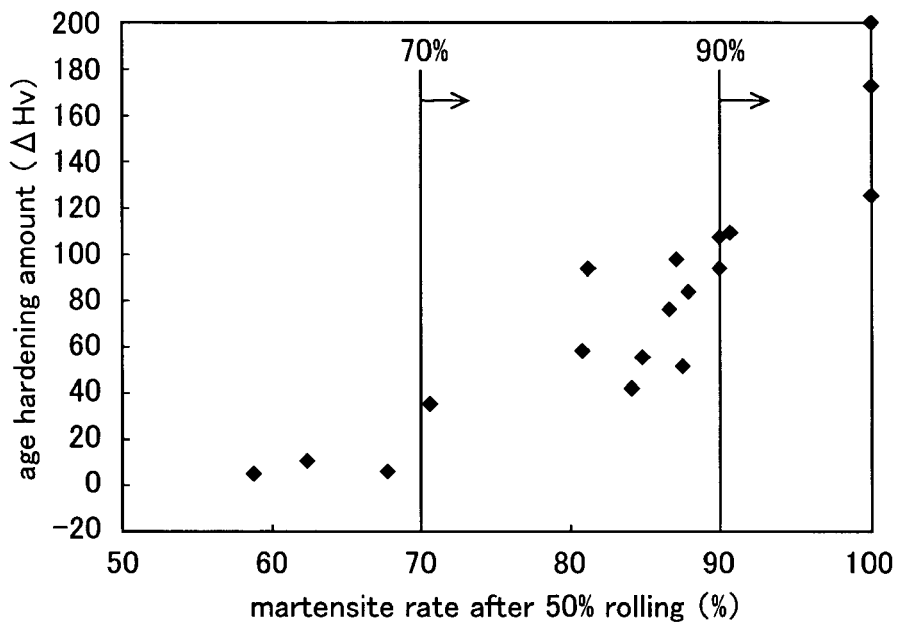
FIG. 7 shows a relationship between age hardening amount (ΔHv) which is the hardness difference before and after aging at 450° C. and martensite rate (%) after 50% rolling.

FIG. 7 shows a relationship between age hardening amount (ΔHv) which is the hardness difference before and after aging at 450° C. (data in Table 2 described hereinafter) and martensite rate (%) after 50% rolling (data in Table 2 similarly described hereinafter). As shown in FIG. 7, a correlation between the age hardening amount and the martensite rate is observed, the age hardening can be performed when the martensite rate after the rolling is not less than 70%. In particular, remarkable age hardening amount is observed when the martensite rate is not less than 90%.

The martensite rate after the rolling depends on Md30 value defined by the following equation shown by weight percentage of each composition.

$$Md30 = 497 - 462(C+N) - 9.2Si - 8.1Mn$$
$$-13.7Cr - 20(Ni+Cu) - 18.5Mo$$

Figure 8:
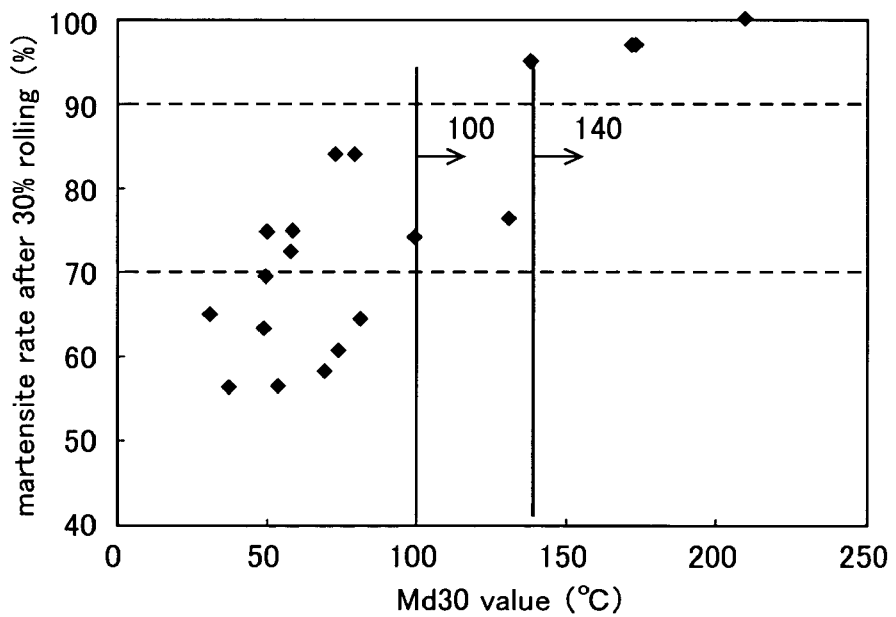
FIG. 8 shows a relationship between martensite rate (%) after 30% rolling and Md 30 value (C).

The Md30 value is an empirical formula which shows a temperature (C) in which 60% martensitic transformation at volume ratio is realized when 30% tensile deformation is given. FIG. 8 shows a relationship between martensite rate (%) after 30% rolling (data in Table 2 described hereinafter) and Md 30 value (° C.) (data in Table 2 similarly described hereinafter). When the rolling rate is 30%, the above mentioned martensite rate can be not less than 70% if the Md30 value is not less than 100° C., the martensite rate can be reliably not less than 90% if the Md30 value is not less than 140° C. Therefore, the Md30 value is suitably not less than 100° C., and it is more suitably not less than 140° C.

The steel strip of the present invention was explained above, and production methods for a hoop for a continuously variable transmission of an automobile of the present invention, obtained by using these steel strips, will be explained in detail hereinafter.

The present invention provides a production method for a hoop for a continuously variable transmission of an automobile in which cold rolling of not less than 30% is performed on a steel strip made of martensitic steel in which C+N is not more than 0.12 wt %, Si is not more than 1 wt %, Mn is not more than 7 wt %, Ni is 2 to 24 wt %, Cr is 2 to 16 wt %, Mo is not more than 2.5 wt %, and Ni-Bal≧1.2, Ms≧−28. According to the method, the hoop of precise size and shape can be produced by producing the hoop by performing general cold rolling on a steel strip produced under the above mentioned various reasons for limitations, and this manufacturing can be simply performed without separately performing a heat treatment and a plastic deformation in the cold as in a conventional technology.

The present invention also provides another production method for a hoop for a continuously variable transmission of an automobile in which cold rolling of not less than 30% is performed on a steel strip in which C+N is not more than 0.12 wt %, Si is not more than 1 wt %, Mn is not more than 7 wt %, Ni is 2 to 24 wt %, Cr is 2 to 16 wt %, Mo is not more than 2.5 wt %, and Ni-Bal≧1.2, Ms≧−28, Md30≧100, and afterwards, the steel strip is aged at a temperature of not more than a martensite inverse transformation temperature. According to the method, a hoop with excellent strength based on the aging can be produced without decreasing the dimensional accuracy, specifically by setting the Md30 value of the steel strip to be not less than 100° C. and by aging at a temperature of not more than an martensite inverse transformation temperature.

Moreover, the present invention also provides another production method for a hoop for a continuously variable transmission of an automobile in which cold rolling of not less than 30% is performed on a steel strip in which C+N is not more than 0.12 wt %, Si is not more than 1 wt %, Mn is not more than 7 wt %, Ni is 2 to 24 wt %, Cr is 2 to 10 wt %, Mo is not more than 2.5 wt %, and Ni-Bal≧1.2, Ms≧−28, and afterwards, the steel strip is nitrified. According to the method, the surface hardness of the hoop can decrease specifically by setting the Cr content in the steel strip to be 2 to 10 wt % and by nitriding. This production method is extremely effective for members, which requires curvature fatigue characteristics, such as a hoop for a continuously variable transmission of an automobile.

Furthermore, the present invention also provides another production method for a hoop for a continuously variable transmission of an automobile in which cold rolling of not less than 30% is performed on a steel strip in which C+N is not more than 0.12 wt %, Si is not more than 1 wt %, Mn is not more than 7 wt %, Ni is 2 to 24 wt %, Cr is 2 to 16 wt %, Mo is not more than 2.5 wt %, and Ni-Bal≧1.2, Ms≧−28, Md30≧100, and afterwards, the steel strip is aged at a temperature of not more than the martensite inverse transformation temperature and is nitrified. According to the method, a hoop with excellent strength based on the aging can be produced without decreasing the dimensional accuracy, by setting Md30 value of the steel strip to be not less than 100° C. and by aging at the temperature of not more than the martensite inverse transformation temperature. At the same time, a hoop with excellent wear resistance and fatigue strength can be produced by nitriding.

EXAMPLES

Hereinafter, the present invention will be explained in further detail by examples.

Table 1 respectively shows practical examples 1 to 4 according to the present invention and comparative examples 1 to 15 according to the conventional technology, concerned with composition of steel strip as a material of a hoop for a continuously variable transmission of an automobile. After steel strips 250 mm wide and 0.4 mm thick, having each composition shown in the Table 1 were annealed, 30% rolling and 50% rolling were performed in order, and aging was performed on the 50% rolled products by the present inventor. After steel strips 250 mm wide and 0.4 mm thick, having each of the compositions shown in Table 1 were annealed, 30% rolling and 50% rolling were performed in order, and nitriding was performed on the 50% rolled products by the present inventor. Table 2 shows results concerned with hardness (Hv) after 50% rolling and aging each steel strip, hardening amount (ÄHv) after aging, and surface hardness (Hv) after nitriding each steel strip. The other data shown together in Table 2 are data with regard to parameters of vertical line or horizontal axis in graphs of the steel strips shown in FIG. 1 to FIG. 8.

TABLE 1

| | | | | | | (wt %: balance of substantially Fe) | | | |
| | C | Si | Mn | Cr | Ni | Mo | Cu | N | Nb |
| --- | --- | --- | --- | --- | --- | --- | --- | --- | --- |
| practical example 1 | 0.045 | 0.45 | 5.48 | 4.98 | 9.57 | 1.02 | 0.00 | 0.023 | 0.11 |
| practical example 2 | 0.032 | 0.45 | 5.43 | 10.34 | 4.59 | 1.03 | 0.00 | 0.020 | 0.00 |
| practical example 3 | 0.038 | 0.46 | 5.39 | 4.91 | 7.17 | 2.01 | 0.00 | 0.022 | 0.10 |
| practical example 4 | 0.042 | 0.45 | 5.47 | 5.15 | 5.94 | 1.00 | 0.00 | 0.022 | 0.00 |
| comparative example 1 | 0.058 | 1.12 | 0.35 | 15.26 | 3.59 | 0.22 | 1.58 | 0.089 | 0.06 |
| comparative example 2 | 0.054 | 1.57 | 0.98 | 15.61 | 4.03 | 0.21 | 1.98 | 0.112 | 0.06 |
| comparative example 3 | 0.069 | 0.89 | 7.23 | 15.58 | 4.22 | 0.19 | 0.00 | 0.130 | 0.06 |
| comparative example 4 | 0.054 | 1.27 | 2.89 | 15.84 | 4.23 | 0.19 | 0.00 | 0.136 | 0.06 |
| comparative example 5 | 0.054 | 1.85 | 1.55 | 15.07 | 4.01 | 0.21 | 0.00 | 0.153 | 0.06 |
| comparative example 6 | 0.042 | 0.45 | 7.56 | 13.91 | 6.01 | 1.02 | 0.00 | 0.021 | 0.09 |

TABLE 1-continued

|  | | | | | | | | (wt %: balance of substantially Fe) | |
| --- | --- | --- | --- | --- | --- | --- | --- | --- | --- |
|  | C | Si | Mn | Cr | Ni | Mo | Cu | N | Nb |
| comparative example 7 | 0.054 | 2.54 | 1.91 | 15.62 | 4.01 | 1.05 | 0.00 | 0.099 | 0.07 |
| comparative example 8 | 0.046 | 4.52 | 0.33 | 15.17 | 4.02 | 1.57 | 0.00 | 0.075 | 0.06 |
| comparative example 9 | 0.075 | 0.57 | 6.91 | 14.11 | 3.44 | 2.10 | 0.00 | 0.090 | 0.09 |
| comparative example 10 | 0.081 | 0.25 | 0.65 | 16.88 | 4.21 | 2.51 | 0.00 | 0.090 | 0.00 |
| comparative example 11 | 0.020 | 0.51 | 1.53 | 17.30 | 5.35 | 0.00 | 0.00 | 0.167 | 0.06 |
| comparative example 12 | 0.019 | 0.52 | 1.52 | 17.29 | 5.91 | 0.00 | 0.00 | 0.126 | 0.06 |
| comparative example 13 | 0.021 | 0.51 | 1.55 | 17.21 | 6.23 | 0.00 | 0.00 | 0.171 | 0.07 |
| comparative example 14 | 0.022 | 0.52 | 1.52 | 17.19 | 6.98 | 0.00 | 0.00 | 0.098 | 0.06 |
| comparative example 15 | 0.021 | 0.51 | 1.53 | 17.09 | 8.12 | 0.00 | 0.00 | 0.044 | 0.07 |

TABLE 2

|  | C + N content (wt %) | Ms value (° C.) | Md30 value (° C.) | Ni-Bal value | change of Mn amount before and after laser welding(wt %) | Ni segregation ratio in welded portion | martensite rate(%) | | |
| --- | --- | --- | --- | --- | --- | --- | --- | --- | --- |
|  |  |  |  |  |  |  | annealing | 30% rolling | 50% rolling |
| practical example 1 | 0.068 | −28 | 139 | 16.3 | −0.6 | 1.13 | 62 | 95 | 100 |
| practical example 2 | 0.052 | 72 | 172 | 5.0 | −0.3 | 1.14 | 83 | 97 | 100 |
| practical example 3 | 0.060 | 8 | 174 | 13.7 | 0.1 | 1.14 | 90 | 97 | 100 |
| practical example 4 | 0.064 | 84 | 211 | 12.4 | −0.2 | 1.15 | 100 | 100 | 100 |
| comparative example 1 | 0.147 | −45 | 131 | −2.3 | 0.0 | 1.86 | 50 | 76 | 88 |
| comparative example 2 | 0.166 | −117 | 100 | −2.1 | 0.0 | 1.81 | 35 | 74 | 84 |
| comparative example 3 | 0.199 | −130 | 37 | 3.4 | −1.3 | 1.36 | 1 | 56 | 59 |
| comparative example 4 | 0.190 | −72 | 69 | 0.1 | −0.2 | 1.63 | 2 | 58 | 63 |
| comparative example 5 | 0.207 | −61 | 81 | −0.4 | 0.0 | 1.68 | 31 | 65 | 71 |
| comparative example 6 | 0.063 | −50 | 73 | 3.8 | −3.0 | 1.31 | 37 | 84 | 90 |
| comparative example 7 | 0.153 | −44 | 74 | −3.6 | 0.0 | 2.14 | 22 | 61 | 68 |
| comparative example 8 | 0.121 | −7 | 80 | −8.1 | 0.0 | 2.18 | 82 | 84 | 87 |
| comparative example 9 | 0.165 | −128 | 59 | 3.6 | −0.5 | 1.23 | 25 | 75 | 88 |
| comparative example 10 | 0.171 | −127 | 49 | −1.1 | 0.0 | 1.87 | 24 | 63 | 85 |
| comparative example 11 | 0.187 | −108 | 50 | 0.1 | 0.0 | 1.72 | 45 | 75 | 81 |
| comparative example 12 | 0.145 | −73 | 58 | −0.7 | −0.1 | 1.85 | 27 | 73 | 91 |
| comparative example 13 | 0.192 | −139 | 31 | 1.2 | −0.1 | 1.36 | 39 | 65 | 81 |
| comparative example 14 | 0.120 | −72 | 49 | −0.2 | −0.1 | 1.86 | 20 | 70 | 87 |
| comparative example 15 | 0.065 | −38 | 53 | −0.6 | 0.1 | 1.78 | 15 | 57 | 90 |

|  | hardness(Hv) | | | work hardening amount (Δ Hv) | | hardness after 50% rolling and aging(Hv) | age hardening amount (Δ Hv) | surface hardness after nitriding(Hv) |
| --- | --- | --- | --- | --- | --- | --- | --- | --- |
|  | annealing | 30% rolling | 50% rolling | 30% rolling | 50% rolling |  |  |  |
| practical example 1 | 289 | 419 | 450 | 130 | 161 | 623 | 173 | 890 |
| practical example 2 | 258 | 388 | 450 | 130 | 192 | 623 | 173 | 937 |
| practical example 3 | 303 | 375 | 392 | 72 | 89 | 592 | 200 | 865 |
| practical example 4 | 315 | 367 | 391 | 52 | 76 | 517 | 126 | 912 |
| comparative example 1 | 410 | 466 | 487 | 56 | 77 | 538 | 51 | 1126 |

TABLE 2-continued

| | | | | | | | | |
|---|---|---|---|---|---|---|---|---|
| comparative example 2 | 434 | 489 | 507 | 55 | 73 | 549 | 42 | 1163 |
| comparative example 3 | 274 | 569 | 610 | 295 | 336 | 614 | 4 | 1219 |
| comparative example 4 | 346 | 536 | 552 | 190 | 206 | 562 | 10 | 1136 |
| comparative example 5 | 459 | 547 | 572 | 88 | 113 | 607 | 35 | 1186 |
| comparative example 6 | 248 | 405 | 484 | 157 | 236 | 592 | 108 | 1122 |
| comparative example 7 | 282 | 507 | 535 | 225 | 253 | 540 | 5 | 1140 |
| comparative example 8 | 321 | 451 | 487 | 130 | 166 | 563 | 76 | 1092 |
| comparative example 9 | 225 | 532 | 551 | 307 | 326 | 635 | 84 | 1080 |
| comparative example 10 | 280 | 450 | 530 | 170 | 250 | 585 | 55 | 1166 |
| comparative example 11 | 416 | 485 | 508 | 69 | 92 | 602 | 94 | 1136 |
| comparative example 12 | 287 | 440 | 455 | 153 | 168 | 565 | 110 | 1227 |
| comparative example 13 | 415 | 469 | 508 | 54 | 93 | 566 | 58 | 1194 |
| comparative example 14 | 272 | 438 | 459 | 166 | 187 | 557 | 98 | 1171 |
| comparative example 15 | 231 | 401 | 426 | 170 | 195 | 520 | 94 | 1198 |

Figure 9:
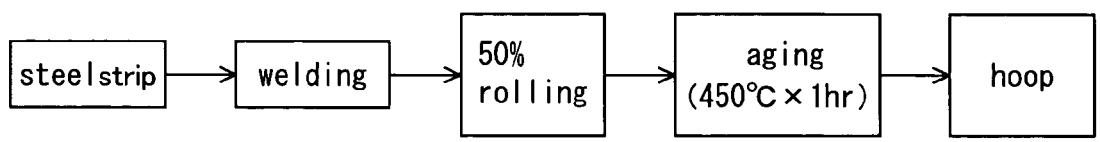
FIG. 9 shows a series of manufacturing processes in which a product hoop is produced from a steel strip.

According to a manufacturing process shown in FIG. 9, steel strips with each composition of practical example 2 and comparative example 7 were processed into hoops for a continuously variable transmission of an automobile. In each hoop, the thickness was 0.18 mm, the width was 9 mm, and the circumferential length was 600 mm. A hoop with the composition of practical example 2 was practical example 5, a hoop with the composition of comparative example 7 was comparative example 16, and Table 3 respectively shows hardness before and after the aging after the rolling of each hoop.

TABLE 3

| | before aging | after aging (Hv) |
|---|---|---|
| practical example 5 | 448~465 | 615~624 |
| comparative example 16 | 609~618 | 620~631 |

In comparative example 16, since the martensite amount in the annealing condition is small, the work hardening amount is large, and since the martensite forming amount after the rolling is also small, the hardening is hardly observed even if the aging is performed. In contrast, in practical example 5, hardness after the rolling is drastically lower in comparison with that of comparative example 16, however, hardness after the aging is equivalent to that of comparative example 16.

Figure 10:
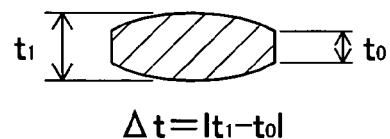
FIG. 10 is a sectional view showing a product hoop after aging.

FIG. 10 is a sectional view of a product hoop after the aging, and Δt in FIG. 10 shows dimensional accuracy of the hoop. As a result of measurement, Δt was 3 to 12 μm in comparative example 16 while Δt was not more than 2 μm in practical example 5. The circumferential length accuracy of the hoops was also measured although it is not shown. According to the result of the measurement, the accuracy in practical example 5 was about ±10 μm which is excellent while the accuracy in comparative example 16 was about ±50 μm.

According to these results, comparative example 16 in which the work hardening amount is large is not preferable for a hoop for a continuously variable transmission of an automobile since sufficient dimensional accuracy for use by laminating cannot be obtained. In practical example 5, dimensional accuracy is extremely superior by small work hardening amount. Therefore, practical example 5 is preferable for a hoop for a continuously variable transmission of an automobile since sufficient dimensional accuracy for use by laminating can be obtained.

Figure 11:
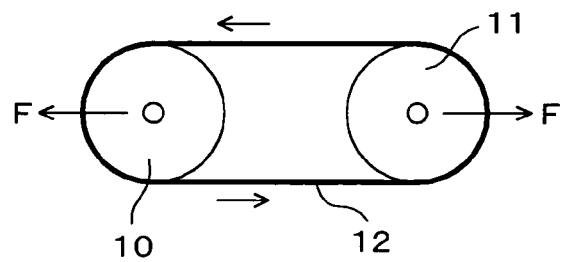
FIG. 11 is a side elevation showing a fatigue strength test apparatus of a product hoop.
Figure 12:
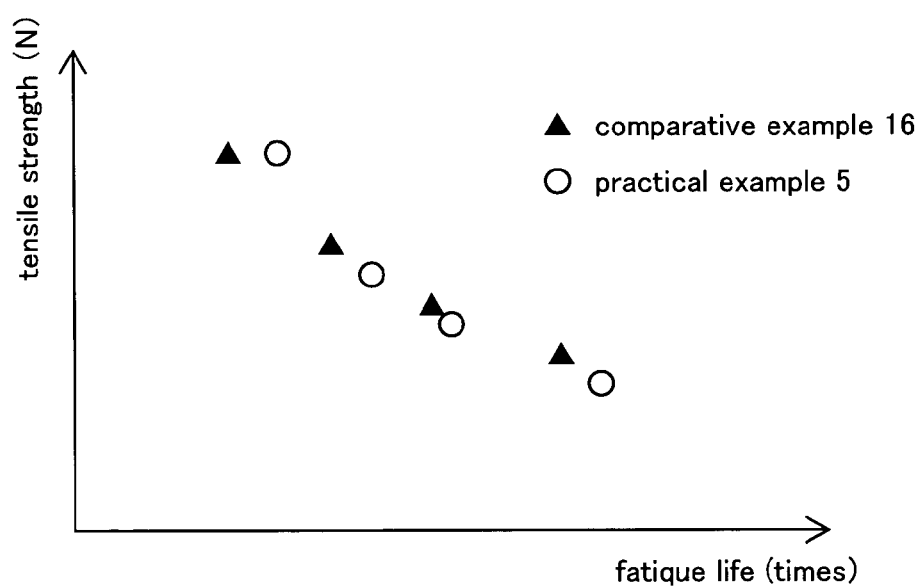
FIG. 12 shows a relationship between tensile strength (N) and fatigue life (times) relating to a fatigue strength test of a product hoop.

Fatigue strength of a hoop is an important characteristic in actually using the hoop for a continuously variable transmission of an automobile. Then, as shown by a side view in FIG. 11, fatigue lives of hoop 12 of various tensile strength F were compared by a fatigue strength test device comprised of 2 rollers 10 and 11. Repeatedly bended time to rupture was fatigue life. The fatigue life was defined by multiplying rotated times of hoop 12 by 2. The test was continued until whether the hoop was broken or fatigue life reached $10^8$ times. This test was performed by using rollers of 55 mm diameter and by setting the rotational rate to be 6000 rpm. FIG. 12 shows the result. The plot shown in FIG. 12 concerns practical example 5 and comparative example 16. As shown in FIG. 12, practical example 5 has fatigue lives which are equivalent to those of comparative example 16, and practical example 5 has sufficient fatigue characteristics in use for a continuously variable transmission of an automobile.

What is claimed is:

1. A steel hoop made from a martensitic steel strip having a composition comprising: not more than 0.12 wt % of C+N, not more than 1 wt % of Si, not more than 7 wt % of Mn, 2 to 24 wt % of Ni, 2 to 5.15 wt % of Cr, more than 1.0 wt % but not more than 2.5 wt % of Mo, wherein Ni-Bal value and Ms value defined by following equations shown by weight percentage of each composition are respectively Ni-Bal≧1.2, Ms≧−28, and wherein opposing ends of the steel strip are joined together to form a hoop before the steel strip is subjected to cold rolling of not less than 30%.

2. The steel hoop made from a martensitic steel strip according to claim 1, wherein Md30 value defined by the following equation shown by weight percentage of each composition is not less than 100

$$Md30=497-462(C+N)-9.2Si-8.1Mn-13.7Cr-20(Ni+Cu)-18.5Mo.$$

3. The steel hoop made from a martensitic steel strip according to claim 2, wherein the steel strip is aged at a temperature of not more than a martensite inverse transformation temperature after cold rolling.

4. The steel hoop made from a martensitic steel strip according to claim 1, wherein the steel strip is nitrided after cold rolling.

5. The steel hoop made from a martensitic steel strip according to claim 3, wherein the steel strip is nitrided after cold rolling.

* * * * *